(12) United States Patent
Prince et al.

(10) Patent No.: US 10,352,173 B2
(45) Date of Patent: Jul. 16, 2019

(54) SHAPE MEMORY ALLOY VARIABLE STIFFNESS AIRFOIL

(71) Applicant: United Technologies Corporation, Hartford, CT (US)

(72) Inventors: Troy Shannon Prince, East Hartford, CT (US); Matthew E. Bintz, West Hartford, CT (US); Charles P. Gendrich, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 641 days.

(21) Appl. No.: 15/058,892

(22) Filed: Mar. 2, 2016

(65) Prior Publication Data

US 2017/0254208 A1    Sep. 7, 2017

(51) Int. Cl.

| F01D 5/14 | (2006.01) |
|---|---|
| B29C 35/02 | (2006.01) |
| B29D 99/00 | (2010.01) |
| B29C 70/88 | (2006.01) |
| B29C 70/86 | (2006.01) |
| B29C 65/48 | (2006.01) |
| B29C 65/00 | (2006.01) |

(Continued)

(52) U.S. Cl.
CPC .............. *F01D 5/148* (2013.01); *B29C 35/02* (2013.01); *B29C 65/48* (2013.01); *B29C 66/742* (2013.01); *B29C 70/865* (2013.01); *B29C 70/88* (2013.01); *B29D 99/0025* (2013.01); *F01D 5/141* (2013.01); *F01D 5/147* (2013.01); *F01D 5/282* (2013.01); *F03G 7/065* (2013.01); *B29K 2305/00* (2013.01); *B29L 2031/082* (2013.01); *F05D 2220/36* (2013.01); *F05D 2300/505* (2013.01); *F05D 2300/603* (2013.01); *Y02T 50/672* (2013.01); *Y02T 50/673* (2013.01)

(58) Field of Classification Search
CPC ....... F01D 5/148; F03G 7/065; B29C 70/865; B29C 70/88
See application file for complete search history.

(56) References Cited

U.S. PATENT DOCUMENTS 4,922,096 A * 5/1990 Brennan ................... B64C 3/48
                                                    244/3.16
5,114,104 A * 5/1992 Cincotta .................. B64C 3/48
                                                    244/219

(Continued)

FOREIGN PATENT DOCUMENTS

| EP | 1681439 | 7/2006 |
|---|---|---|
| GB | 2430472 | 3/2007 |

(Continued)

OTHER PUBLICATIONS

European Search Report dated Jul. 19, 2017 in EP Application No. 17158530.0.

*Primary Examiner* — Igor Kershteyn
*Assistant Examiner* — John S Hunter, Jr.
(74) *Attorney, Agent, or Firm* — Snell & Wilmer, L.L.P.

(57) ABSTRACT

An aerostructure is provided. The aerostructure may comprise an airfoil extending from a leading edge to a trailing edge, the airfoil comprising a stiffness and a camber, and a shape memory alloy (SMA) mechanically coupled to the airfoil via a resin, the SMA configured to be coupled to a current source, wherein at least one of the stiffness or the camber changes in response to a phase change of the SMA.

7 Claims, 10 Drawing Sheets

(51) Int. Cl.
*F01D 5/28* (2006.01)
*F03G 7/06* (2006.01)
*B29K 305/00* (2006.01)
*B29L 31/08* (2006.01)

(56) References Cited

U.S. PATENT DOCUMENTS

| | | | | |
|---|---|---|---|---|
| 5,662,294 | A * | 9/1997 | Maclean | B63B 1/28 114/140 |
| 6,465,902 | B1 * | 10/2002 | Beauchamp | F01D 5/148 244/215 |
| 7,384,240 | B2 * | 6/2008 | McMillan | F01D 5/147 416/131 |
| 8,011,882 | B2 * | 9/2011 | McMillan | F01D 5/147 415/148 |
| 2012/0045318 | A1 | 2/2012 | Lamaster | |
| 2013/0302168 | A1 * | 11/2013 | Kray | F01D 5/141 416/131 |

FOREIGN PATENT DOCUMENTS

| | | |
|---|---|---|
| GB | 2490127 | 10/2012 |
| WO | 2014028077 | 2/2014 |

\* cited by examiner

SHAPE MEMORY ALLOY VARIABLE STIFFNESS AIRFOIL

FIELD

The present disclosure relates to gas turbine engines, and, more specifically, to aerostructures such as fan blades for gas turbine engines.

BACKGROUND

Flutter is a phenomenon encountered in flexible structures subjected to aerodynamic forces. Flutter may occur as a result of interactions between aerodynamics, stiffness, and inertial forces on a structure. In regards to a gas turbine engine, as the speed of inlet air across a fan blade, for example, increases, there may be a point at which the structural damping is insufficient to dampen the vibrational frequency which may increase due to aerodynamic energy being added to the fan blade.

Furthermore, engine inlet flow conditions may be determined by a direction of air flow relative to the fan blades. In this regard, an angle of incidence of an airfoil with respect to the direction of air flow may determine certain engine operating conditions.

SUMMARY

A composite blade for a gas turbine engine may comprise an airfoil extending from a leading edge to a trailing edge, the airfoil may comprise a stiffness and a camber, and a shape memory alloy (SMA) mechanically coupled to the airfoil via a resin, wherein at least one of the stiffness or the camber changes in response to a phase change of the SMA.

In various embodiments, the composite blade may comprise at least one of a carbon fiber composite or a glass fiber composite and the SMA may be configured to be coupled to a current source. The SMA may extend through an inner portion of the airfoil. The SMA may be coupled between at least one of the leading edge and a root of the composite blade, the trailing edge and the root of the composite blade, the leading edge and a tip of the composite blade, the trailing edge and the tip of the composite blade, or the leading edge and the trailing edge of the composite blade. The SMA may extend in a direction which is at least one of: substantially parallel to a fluid flow direction, at an angle to the fluid flow direction, or substantially perpendicular to the fluid flow direction. The SMA may comprise a nickel-titanium alloy configured to change from an austenite phase to a martensite phase in response to an increase in current from the current source and configured to change from the martensite phase to the austenite phase in response to a decrease in current from the current source. The SMA may extend along an outer surface of the airfoil. The composite blade may comprise a laminate, the SMA being mechanically coupled between a first layer and a second layer of the laminate via the resin, the resin electrically insulating the SMA.

A variable stiffness aerostructure may comprise a shape memory alloy (SMA) electrically isolated from the variable stiffness aerostructure, the SMA configured to be coupled to a current source, wherein the SMA increases a stiffness of the variable stiffness aerostructure in response to an increase in a current being supplied from the current source.

In various embodiments, the variable stiffness aerostructure may comprise an airfoil extending from a leading edge to a trailing edge and extending from a root to a tip. The SMA may comprise an outer surface defining at least a portion of the variable stiffness aerostructure. The SMA may comprise at least one of a wire or a sheet extending through an inner portion of the variable stiffness aerostructure. The SMA may be electrically isolated from the variable stiffness aerostructure via an oxide grown on a surface of the SMA, a diffusion bond being formed between the SMA and the variable stiffness aerostructure. The SMA may change a geometry of the variable stiffness aerostructure in response to an increase in the current being supplied from the current source. The variable stiffness aerostructure may comprise a temperature sensor embedded in the variable stiffness aerostructure, the current being controllable based on a temperature sensed by the temperature sensor. The current may be controlled, at least in part, by a resistance of the SMA. The increase in the current may be configured to change a modulus of the variable stiffness aerostructure.

A method of manufacturing a variable stiffness aerostructure may comprise placing a first composite fabric sheet onto a tool, placing a shape memory alloy (SMA) over the first composite fabric, the SMA having a point of connection whereby an external current source may be coupled to the point of connection, and placing a second composite fabric sheet over the SMA, wherein a resin is located between the first composite fabric sheet and the second composite fabric sheet, and applying heat to the variable stiffness aerostructure to cure the resin.

In various embodiments, The SMA may comprise at least one of a wire or a metallic sheet. The SMA may comprise a nickel-titanium alloy.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "gas" and "air" may be used interchangeably.

Flutter is a phenomenon encountered in flexible structures subjected to aerodynamic forces. Flutter may occur as a result of interactions between aerodynamics, stiffness, and inertial forces on a structure. In regards to an aircraft, as the speed of the air across the aircraft increases, there may be a point at which the structural damping is insufficient to dampen the vibrational frequency which may increase due to aerodynamic energy being added to the structure. In regards to a gas turbine engine, as the speed of bypass air across a fan blade, for example, increases, there may be a point at which the structural damping is insufficient to dampen the vibrational frequency which may increase due to aerodynamic energy being added to the fan blade. These vibrations may cause high-cycle fatigue or other failures.

Figure 1:
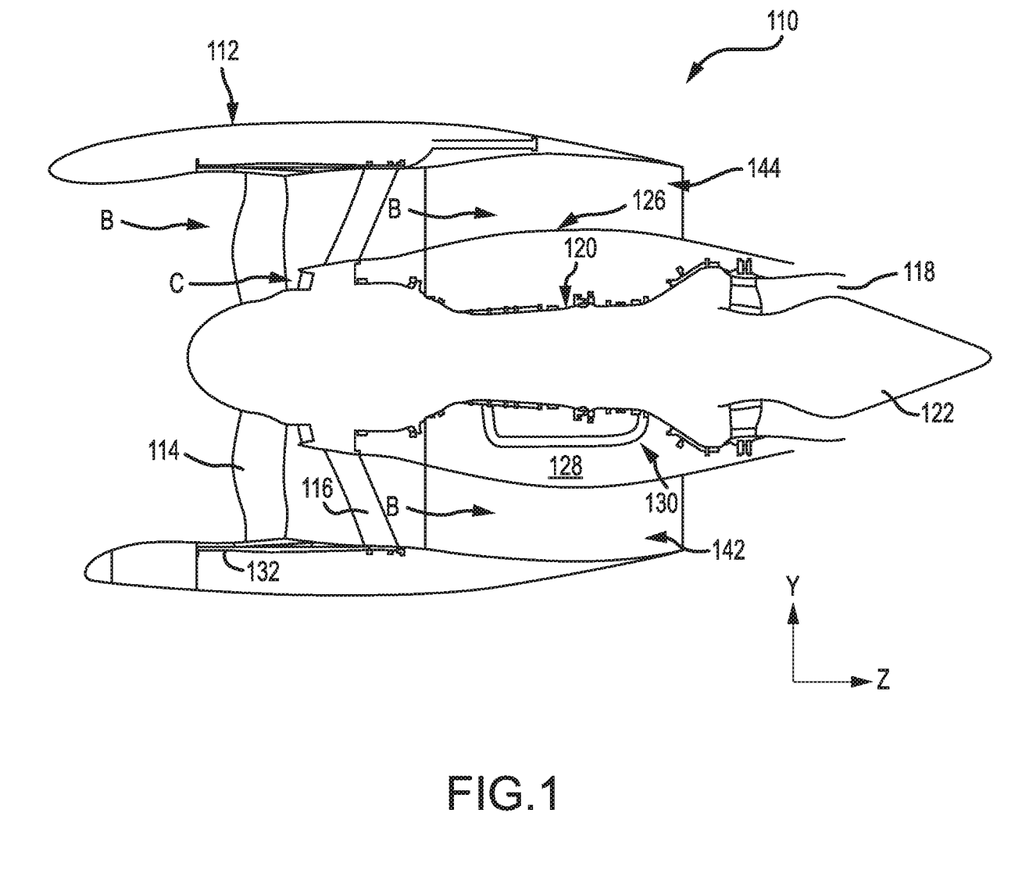
FIG. 1 illustrates a cross-sectional view of an exemplary gas turbine engine, in accordance with various embodiments.

FIG. 1 illustrates a schematic view of a gas turbine engine, in accordance with various embodiments. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112.

Figure 2:
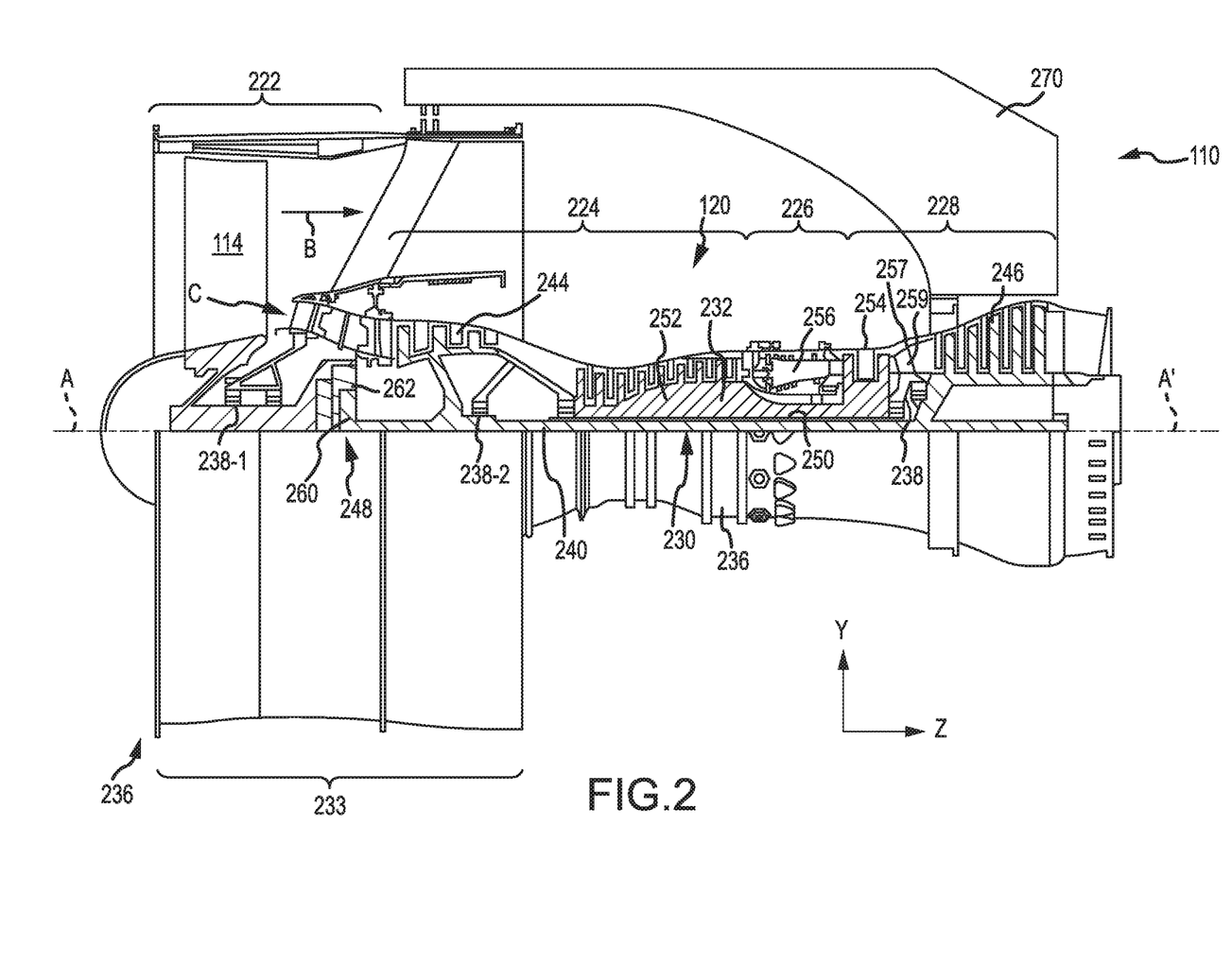
FIG. 2 illustrates a cross-sectional view of an exemplary gas turbine engine mounted to a pylon, in accordance with various embodiments.

With momentary reference to FIG. 2, nacelle 112 typically comprises two halves which are typically mounted to pylon 270. Fan case structure 233 may provide structure for securing gas turbine engine 110 to pylon 270. According to various embodiments, multiple guide vanes 116 may extend radially between core engine 120 and fan case 132.

Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or a compressed air duct 130, for example. Compressed air duct 130 may be under high pressure and may supply compressed cooling air from a compressor stage to a high pressure turbine stage, for example. In various embodiments, a heat exchanger may be coupled to compressed air duct 130.

With respect to FIG. 2, elements with like element numbering as depicted in FIG. 1 are intended to be the same and will not necessarily be repeated for the sake of clarity.

In various embodiments and with reference to FIG. 2, a gas turbine engine 110 is provided. Gas turbine engine 110 may be a two-spool turbofan that generally incorporates a fan section 222, a compressor section 224, a combustor section 226 and a turbine section 228. Alternative engines may include, for example, an augmentor section among other systems or features. In operation, fan section 222 can drive air along a bypass flow-path B while compressor section 224 can drive air along a core flow-path C for compression and communication into combustor section 226 then expansion through turbine section 228. Although depicted as a turbofan gas turbine engine 110 herein, it should be understood that the concepts described herein are not limited to use with two-spool turbofans as the teachings may be applied to other types of turbine engines including single-spool architectures, three-spool architectures, etc.

Gas turbine engine 110 may generally comprise a low speed spool 230 and a high speed spool 232 mounted for rotation about an engine central longitudinal axis A-A' relative to an engine static structure 236 via one or more bearing systems 238 (shown as bearing system 238-1 and bearing system 238-2 in FIG. 2). It should be understood that various bearing systems 238 at various locations may alternatively or additionally be provided including, for example, bearing system 238, bearing system 238-1, and bearing system 238-2.

Low speed spool 230 may generally comprise an inner shaft 240 that interconnects a fan 114, a low pressure (or first) compressor section 244 and a low pressure (or first) turbine section 246. Inner shaft 240 may be connected to fan 114 through a geared architecture 248 that can drive fan 114 at a lower speed than low speed spool 230. Geared architecture 248 may comprise a gear assembly 260 enclosed within a gear housing 262. Gear assembly 260 couples inner shaft 240 to a rotating fan structure. High speed spool 232 may comprise an outer shaft 250 that interconnects a high-pressure compressor ("HPC") 252 (e.g., a second compressor section) and high pressure (or second) turbine section 254. A combustor 256 may be located between HPC 252 and high pressure turbine 254. A mid-turbine frame 257 of engine static structure 236 may be located generally between high pressure turbine 254 and low pressure turbine 246. Mid-turbine frame 257 may support one or more bearing systems 238 in turbine section 228. Inner shaft 240 and outer shaft 250 may be concentric and rotate via bearing systems 238 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 244 then HPC 252, mixed and burned with fuel in combustor 256, then expanded over high pressure turbine 254 and low pressure turbine 246. Mid-turbine frame 257 includes airfoils 259 which are in the core airflow path. Low pressure turbine 246 and high pressure turbine 254 rotationally drive the respective low speed spool 230 and high speed spool 232 in response to the expansion.

Gas turbine engine 110 may be, for example, a high-bypass geared aircraft engine. In various embodiments, the bypass ratio of gas turbine engine 110 may be greater than about six (6). In various embodiments, the bypass ratio of gas turbine engine 110 may be greater than ten (10). In various embodiments, geared architecture 248 may be an epicyclic gear train, such as a star gear system (sun gear in meshing engagement with a plurality of star gears supported by a carrier and in meshing engagement with a ring gear) or other gear system. Geared architecture 248 may have a gear reduction ratio of greater than about 2.3 and low pressure turbine 246 may have a pressure ratio that is greater than about 5. In various embodiments, the bypass ratio of gas turbine engine 110 is greater than about ten (10:1). In various embodiments, the diameter of fan 114 may be significantly larger than that of the low pressure compressor 244, and the low pressure turbine 246 may have a pressure ratio that is greater than about 5:1. Low pressure turbine 246 pressure ratio may be measured prior to inlet of low pressure turbine 246 as related to the pressure at the outlet of low pressure turbine 246 prior to an exhaust nozzle. It should be understood, however, that the above parameters are exemplary of various embodiments of a suitable geared architecture engine and that the present disclosure contemplates other gas turbine engines including direct drive turbofans. FIG. 1 and FIG. 2 provide a general understanding of the sections in a gas turbine engine, and is not intended to limit the disclosure. The present disclosure may extend to all types of turbine engines, including turbofan gas turbine engines and turbojet engines, for all types of applications.

In various embodiments, an aerostructure may comprise an airfoil and a shape memory alloy (SMA). The SMA may be mechanically coupled to the airfoil. In various embodiments, the airfoil may comprise a variable stiffness airfoil. The airfoil may undergo a strain induced phase transformation via the SMA, as discussed herein.

Figure 3A:
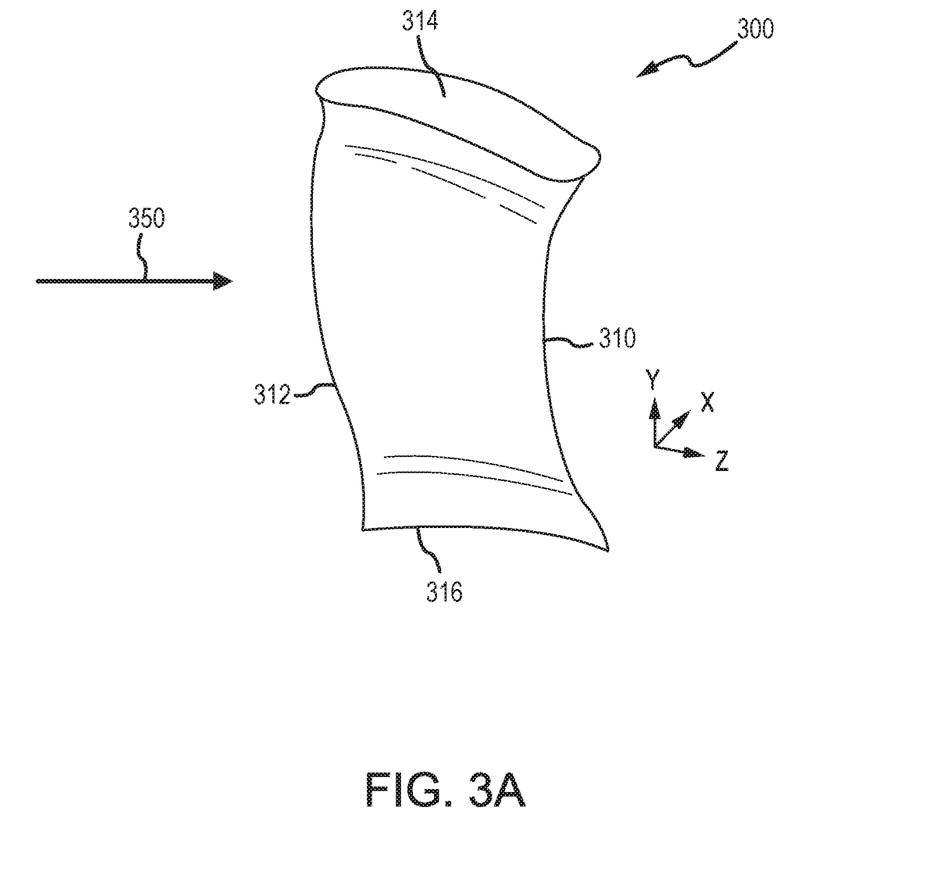
FIG. 3A illustrates an aerostructure, depicted as fan blade, in accordance with various embodiments.

With reference to FIG. 3A, an aerostructure, depicted as fan blade 300 is illustrated, in accordance with various embodiments. An xyz-axes is provided for ease of illustration. Fan blade 300 may comprise a variable stiffness fan blade. Stated another way, the stiffness of fan blade 300 may be varied in accordance with the various embodiments disclosed herein. Fan blade 300 may comprise a root 314 and a tip 316. Fan blade 300 may be configured to be attached to an adjacent component, such as a hub or a shaft for example, at root 314. Fan blade 300 may comprise a leading edge 312 and a trailing edge 310. In general, air may flow from leading edge 312 to trailing edge 310. A fluid flow direction is illustrated by arrow 350. Fluid flow direction 350 may be the direction of the flow of a fluid, such as air. In various embodiments, fluid flow direction 350 may comprise the general direction of air flow into an inlet, through a duct, or out an outlet. In various embodiments, fluid flow direction 350 may be in the positive z-direction. In various embodiments, fan blade 300 may be twisted or otherwise comprise a twist or stagger angle. In various embodiments, fan blade 300 may comprise an angle of incidence with respect to fluid flow direction 350.

Figure 3B:
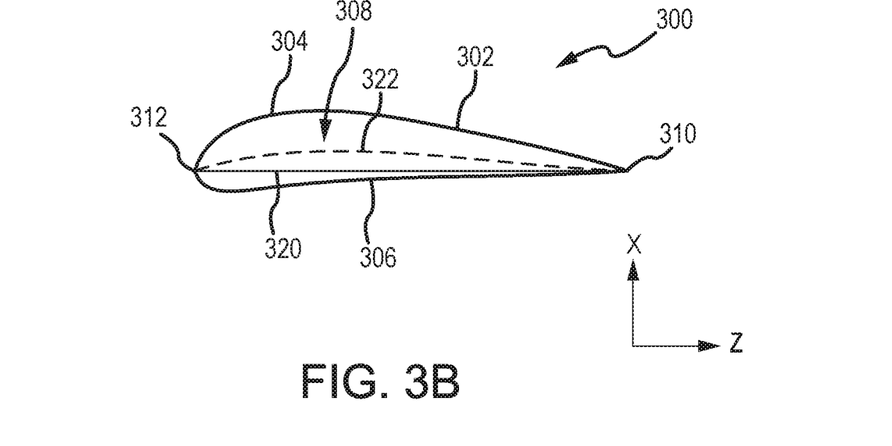
FIG. 3B illustrates a cross-section view of fan blade having a decreased mean camber line in comparison to the mean camber line of FIG. 3C, in accordance with various embodiments.
Figure 3C:
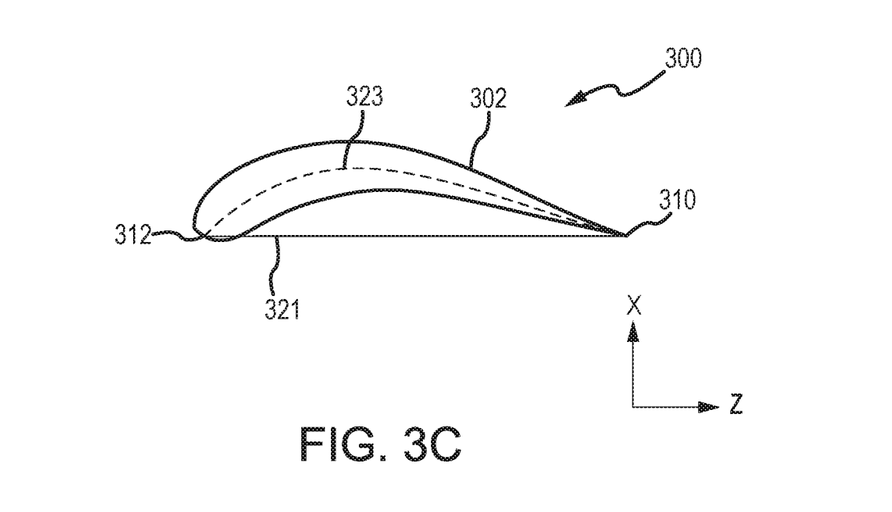
FIG. 3C illustrates a cross-section view of a fan blade having an increased mean camber line in comparison to the mean camber line of FIG. 3B, in accordance with various embodiments.

With reference to FIG. 3B, a cross-section view of fan blade 300 having a decreased mean camber line 322 in comparison to mean camber line 323 of FIG. 3C is illustrated, in accordance with various embodiments. In various embodiments, with momentary additional reference to FIG. 3A, fan blade 300 may comprise an airfoil 302 extending from root 314 to tip 316. Similarly, airfoil 302 may extend from leading edge 312 to trailing edge 310. Airfoil 302 may comprise a chord 320. Chord 320 may comprise an imaginary line extending from leading edge 312 to trailing edge 310. Airfoil 302 may comprise a mean camber line 322. An imaginary line illustrates the mean camber line 322 of airfoil 302. Mean camber line 322 may represent the camber of airfoil 302. Camber may represent the asymmetry between the top surface 304 and the bottom surface 306. FIG. 3B illustrates airfoil 302 having positive camber. In various embodiments, top surface 304 and bottom surface 306 may comprise an outer surface of airfoil 302. Thus, inner portion 308 of airfoil 302 may be any portion of airfoil 302 located inward of top surface 304 and bottom surface 306.

In various embodiments, fan blade 300 may be mechanically coupled to an SMA as described herein. Thus, in response to phase change of the SMA material, airfoil 302 may change geometry resulting in an increased mean camber line 323, as illustrated in FIG. 3C, or a decreased mean camber line 322 as illustrated in FIG. 3B. Similarly, in response to a phase change of the SMA material, airfoil 302 may change geometry resulting in an increased chord length (i.e., chord 320), as illustrated in FIG. 3B, or a decreased chord length (i.e., chord 321) as illustrated in FIG. 3C. With reference to FIG. 3A and FIG. 3B, the angle between chord 321 and fluid flow direction 350 may comprise an angle of incidence.

Figure 10:
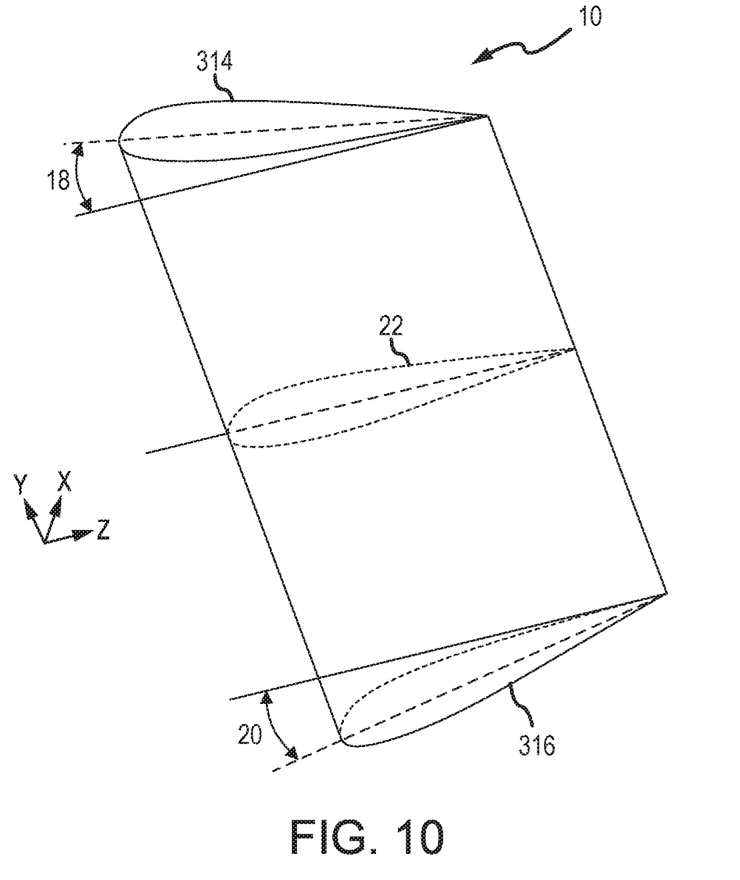
FIG. 10 illustrates a perspective view of a fan blade comprising twist, in accordance with various embodiments.

With reference to FIG. 10, a fan blade 10 comprising a twist is illustrated, in accordance with various embodiments. In various embodiments, fan blade 10 may be similar to fan blade 300. As illustrated in FIG. 10, the root 314 of fan blade 10 may be twisted by an angle 18 with respect to a middle portion 22 of fan blade 10. Furthermore, the tip 316 of fan blade 10 may be twisted by an angle 20 with respect to the middle portion 22 of fan blade 10. Accordingly, fan blade 10 may comprise a twist, or stagger angle. In this manner, a fan blade may comprise a positive twist or a negative twist. A fan blade having no twist may be referred to as a fan blade comprising a twist angle of zero. In various embodiments, the angle of twist 18, or angle of twist 20, may be between zero degrees and ninety degrees (0°-90°). In various embodiments, the angle of twist 18, or angle of twist 20, may be between zero degrees and fifteen degrees (0°-15°). A phase change of an SMA material may change the internal stress profile of fan blade 10 which may manifest itself as a change in the physical profile (i.e., twist, camber, angle of incidence, etc.) of fan blade 10. Thus, in response to a phase change of the SMA material, fan blade 10 may change geometry resulting in an increased or decreased angle of twist. In this manner, the orientation of fan blade 10 may change with respect to a fluid flow direction. Stated another way, the angle of incidence of fan blade 10 may be adjusted via the SMA.

Figure 4A:
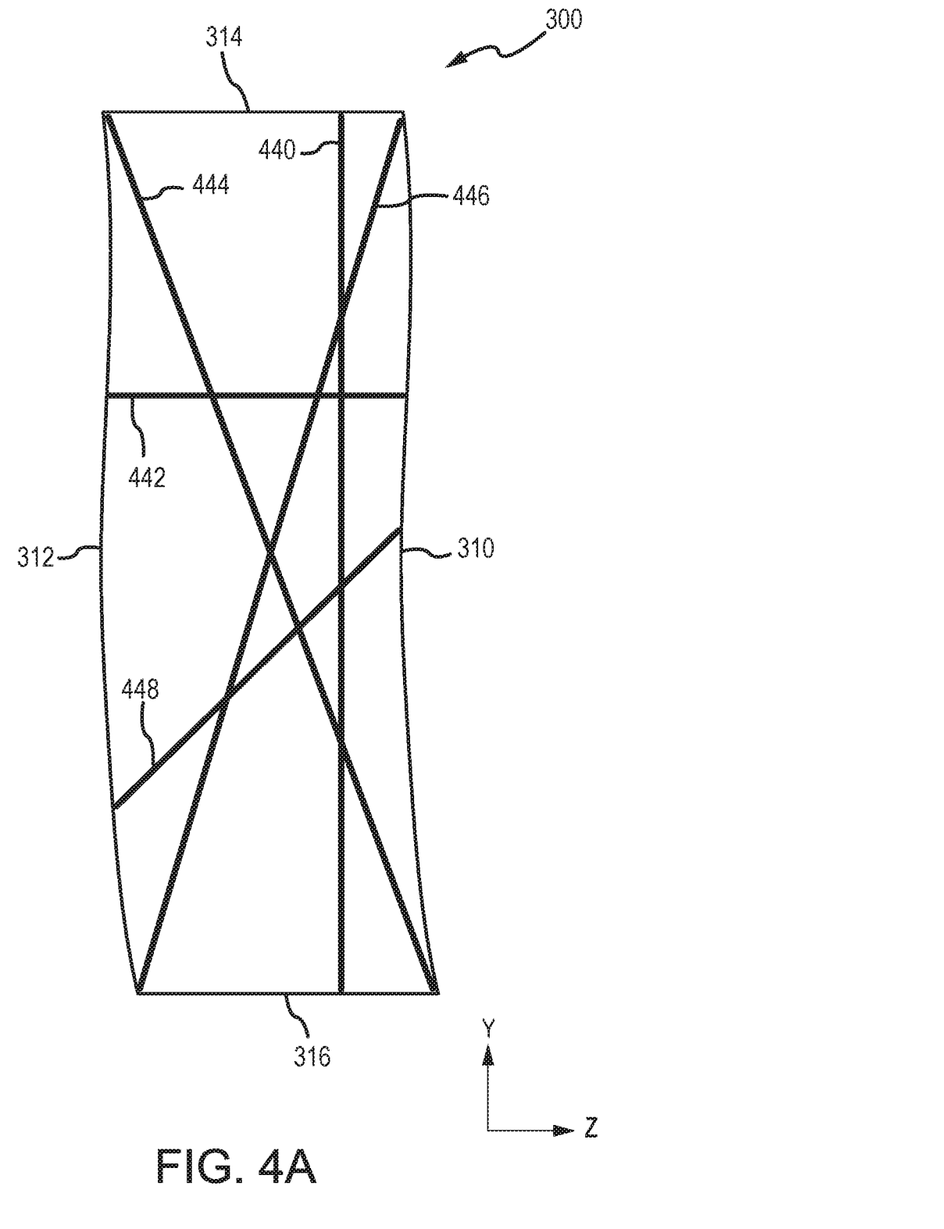
FIG. 4A illustrates a cross section view of a fan blade having a shape memory alloy, in accordance with various embodiments.

With reference to FIG. 4A, a cross section view of fan blade 300 having a shape memory alloy is illustrated, in accordance with various embodiments. In various embodiments, at least a portion of fan blade 300 may comprise a shape memory alloy (SMA). In various embodiments, fan blade 300 may comprise an SMA embedded in fan blade 300. Thus, the SMA may be placed inside of or onto fan blade 300 during manufacture of fan blade 300.

SMA 440 is illustrated extending from root 314 to tip 316. Thus, SMA 440 may extend in a direction substantially perpendicular to fluid flow direction 350 (see FIG. 3A), wherein the term "substantially" in this context only means+/−3 degrees from perpendicular.

SMA 442 is illustrated extending from leading edge 312 to trailing edge 310. Thus, SMA 440 may extend in a direction parallel or substantially parallel to fluid flow direction 350 (see FIG. 3A), wherein the term "substantially" in this context only means+/−3 degrees from parallel.

SMA 444 is illustrated extending from a location proximate the corner of the leading edge 312 and the root 314 to a location proximate the corner of the trailing edge 310 and the tip 316. Thus, SMA 444 may extend or be oriented at an angle with respect to leading edge 312. In various embodiments, the angle may be between one and eighty-nine degrees (1°-89°). Stated another way, SMA 444 may extend or be oriented at an angle with respect to fluid flow direction 350 (see FIG. 3A), wherein the angle may be between one and eighty-nine degrees (1°-89°).

SMA 446 is illustrated extending from a location proximate the corner of the leading edge 312 and the tip 316 to a location proximate the corner of the trailing edge 310 and the root 314.

SMA 448 is illustrated extending from leading edge 312 to trailing edge 310 in a direction which is oriented at an angle with respect to fluid flow direction 350 (see FIG. 3A).

Although FIG. 4A illustrates various SMA's as extending in certain orientations with respect to fan blade 300, it is contemplated herein that an SMA may extend in any direction or be located in an orientation with respect to fan blade 300. For example, with momentary reference to FIG. 3B, an SMA may extend from top surface 304 to bottom surface 306.

Figure 4B:
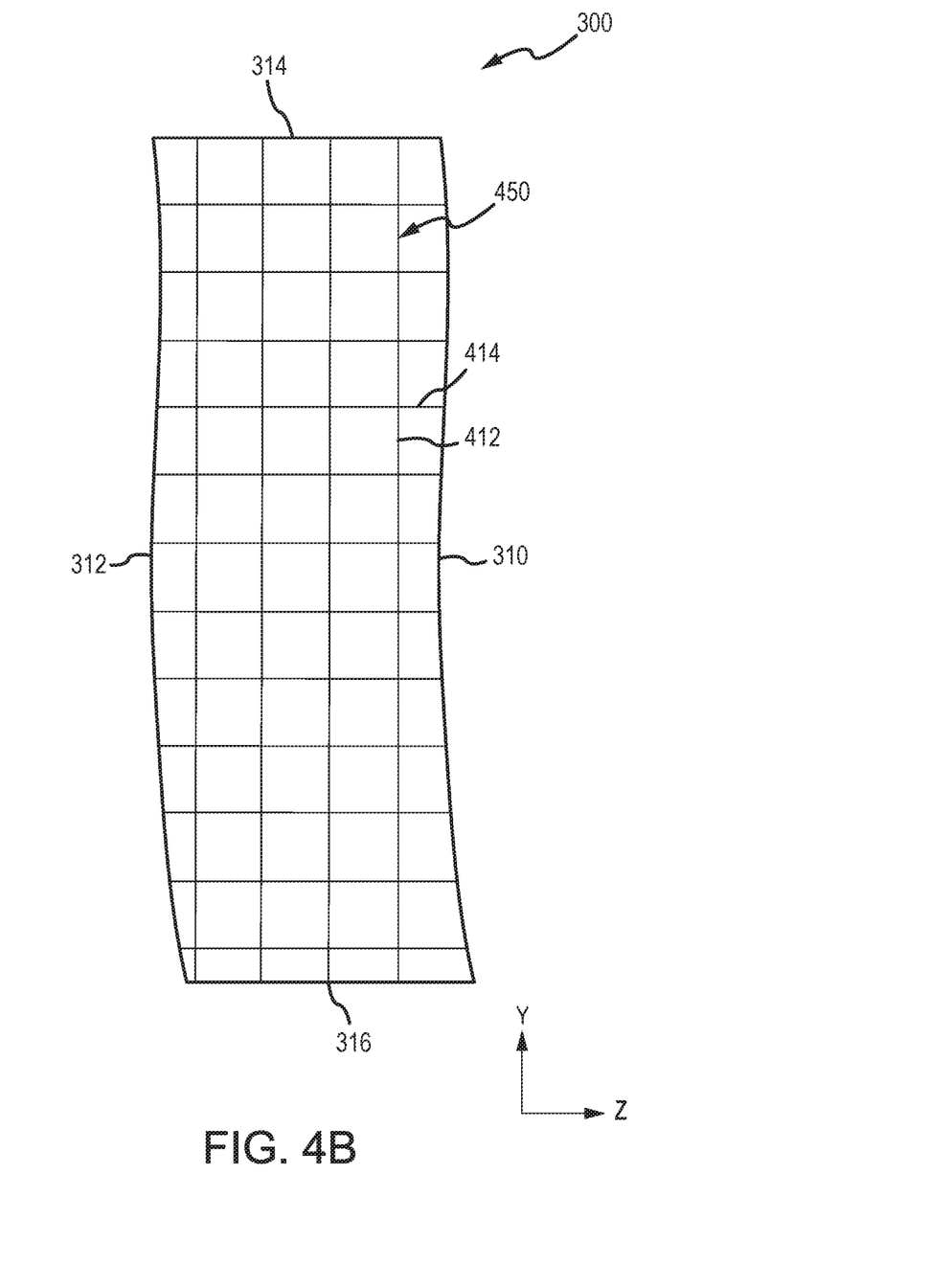
FIG. 4B illustrates a cross section view of a fan blade having a shape memory alloy, in accordance with various embodiments.

With reference to FIG. 4B, a cross section view of fan blade 300 having a shape memory alloy is illustrated, in accordance with various embodiments. In various embodiments, fan blade 300 may comprise an array of SMA's embedded in fan blade 300. In various embodiments, fan blade 300 may comprise an SMA mesh embedded in fan blade 300. SMA mesh 450 may be embedded in fan blade 300. In various embodiments, SMA mesh 450 may comprise a plurality of conductive wires, conductive sheets, conductive plates, or the like. Although illustrated as extending in the y and z directions, SMA mesh 450 may extend in any direction with respect to fan blade 300.

In various embodiments, SMA mesh 450 may include a first array of fibers, such as fiber 412, extending in a first direction (i.e., y-direction) and a second array of fibers, such as fiber 414, extending in a second direction (i.e., z-direction). Fiber 412 and/or fiber 414 may comprise conductive wires, conductive sheets, conductive plates, or the like. In various embodiments, the first array of fibers may be activated while the second array of fibers remains inactive. Stated another way, a phase change may be induced on fiber 412 and at the same time, fiber 414 may maintain its original phase. Thus, the first array of fibers may be electronically insulated from the second array of fibers. Similarly, the second array of fibers may be activated while the first array of fibers remains inactive. Stated another way, a phase change may be induced on fiber 414 and at the same time, fiber 412 may maintain its original phase. Decoupling the first array of fibers from the second array of fibers may allow for various geometry changes of fan blade 300 with a single SMA mesh 450.

In various embodiments, shape memory alloy (SMA) may comprise a temperature tailored sheet or wire which may be embedded within a composite structure of an airfoil. In various embodiments, the webbing or portions of the webbing of the composite airfoil may be constructed of the SMA.

Figure 5:
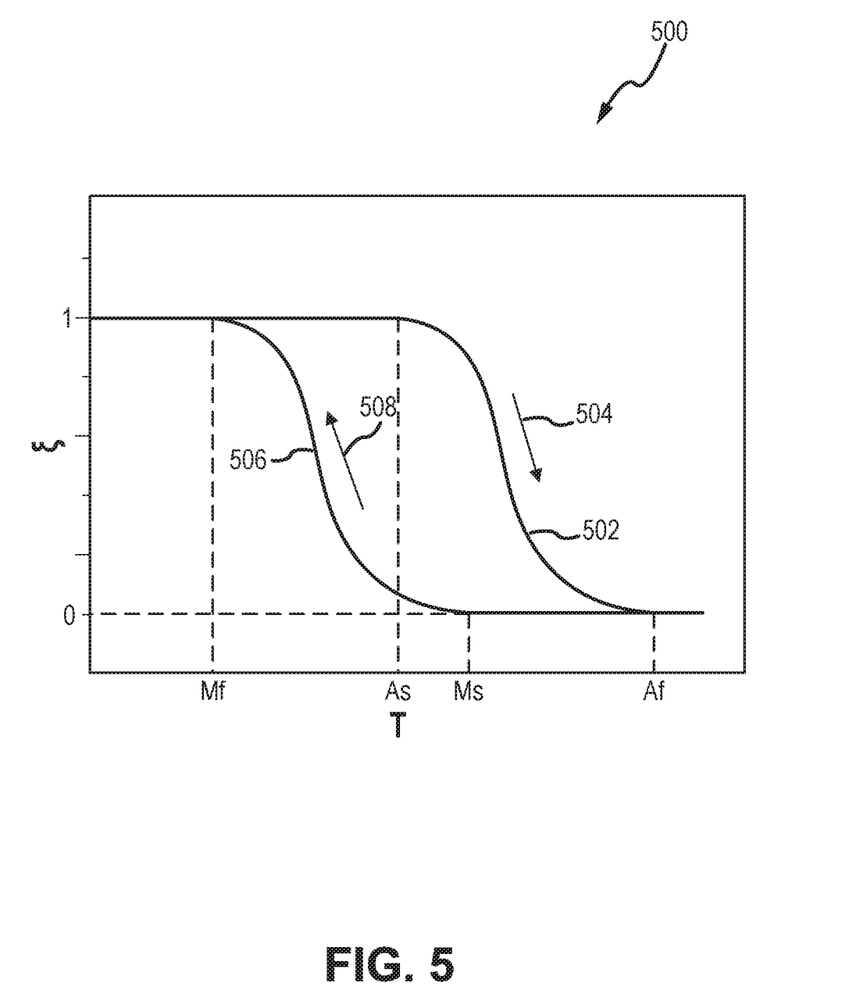
FIG. 5 illustrates a plot of the phase change vs. temperature of a shape memory alloy (SMA), in accordance with various embodiments.

With reference to FIG. 5, a plot 500 illustrating the phase change vs. temperature of a shape memory alloy (SMA) is illustrated. The x-axis of plot 500 illustrates temperature (T) in degrees Fahrenheit. The y-axis of plot 500 illustrates the martensite fraction as a function of temperature ($\xi(T)$). During heating, as illustrated by the direction of arrow 504 and line 502, $A_s$ and $A_f$ are the temperatures at which the transformation from a martensitic phase to an austenitic phase start and finish, respectively. Upon cooling, as illustrated by the direction of arrow 508 and line 506, Ms and $M_f$ are the temperatures at which the transformation from an austenitic phase to a martensitic phase start and finish, respectively. The austenitic phase of an SMA may comprise up to three times the effective stiffness of the martensitic phase of the SMA. Thus, an aerostructure mechanically locked or coupled to an SMA may comprise an increased stiffness in response to the SMA changing from a martensitic phase to an austenitic phase. In this manner, a Young's modulus of an aerostructure (i.e., a fan blade) may be changed in response to the SMA changing from a martensitic phase to an austenitic phase, or vice versa. In this manner, an SMA material may be tailored to have a phase change at a specific temperature. As such, in various embodiments, the phase change in the SMA material may be induced by a change in temperature of the SMA material.

With reference to FIG. 3C, a cross-section view of fan blade 300 having an increased mean camber line 323 in comparison to mean camber line 322 of FIG. 3B is illustrated, in accordance with various embodiments. In response to airfoil 302 being strained in a manner consistent with onset of a flutter condition, an SMA material may undergo a phase change from martensite phase to austenite phase and vice-versa. The change in phase from Martensitic to austenitic, and vice versa, may result in a Young's modulus change of two to three times (2-3×). The resulting stiffening of the material may change the natural frequency of the fan blade 300. The resulting stiffening of the material may attenuate the flutter. In regards to controlling the temperature of the SMA material, the system may be an active system. In regards to the system's response to a flutter condition (i.e. stiffening), the system may be a passive system.

An SMA may morph or change geometry in response to the SMA changing from a martensitic phase to an austenitic phase or vice versa. Thus, an aerostructure mechanically locked or coupled to an SMA may morph or change geometry in response to the SMA changing from a martensitic phase to an austenitic phase or vice versa. In various embodiments, airfoil 302 may morph or change geometry in response to an SMA changing from a martensitic phase to an austenitic phase or vice versa. In various embodiments, mean camber line of airfoil 302 may increase or decrease in response to an SMA changing from a martensitic phase to an austenitic phase or vice versa. In various embodiments, the angle of twist of fan blade 10 (see FIG. 10) may increase or decrease in response to an SMA changing from a martensitic phase to an austenitic phase or vice versa. Thus, as previously mentioned, fan blade 300 may morph or change geometry in response to the SMA changing from a martensitic phase to an austenitic phase or vice versa.

Figure 8:
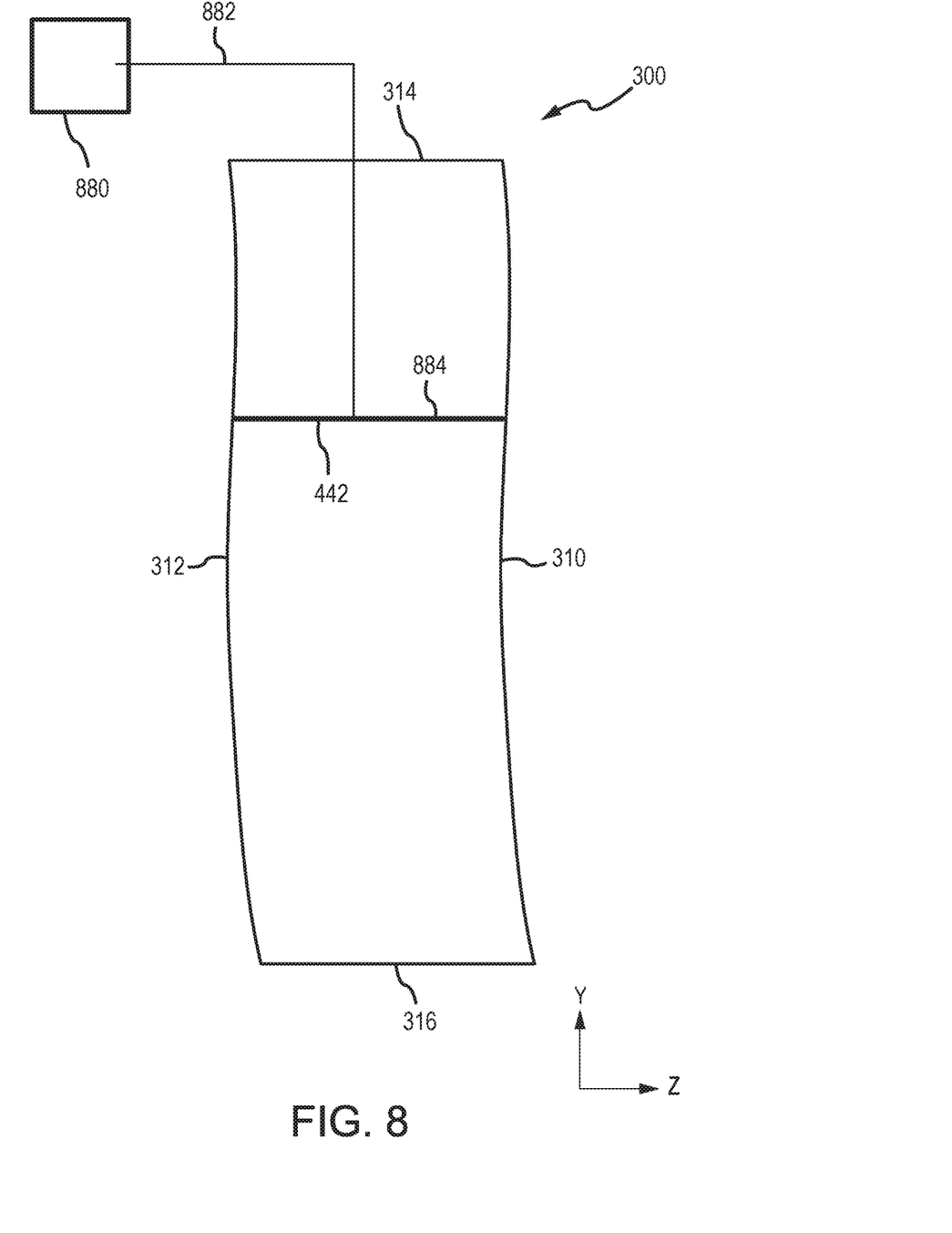
FIG. 8 illustrates a cross-section view of a fan blade having a shape memory alloy (SMA) in electronic communication with a current source, in accordance with various embodiments.

With reference to FIG. 8, a cross-section view of fan blade 300 having SMA 442 in electronic communication with a current source 880 is illustrated, in accordance with various embodiments. In various embodiments, current source 880 may comprise a current controlled source. In various embodiments, current source 880 may comprise a voltage controlled source. In various embodiments, SMA 442 may comprise a wire, sheet, plate, or the like. Although illustrated as extending from leading edge 312 to trailing edge 310, SMA 442 may be oriented in any direction with respect to fan blade 300. In various embodiments, SMA 442 may extend along an inner portion of fan blade 300. The inner portion of fan blade 300 may be any portion of fan blade 300 located inward of an outer surface of fan blade 300. In various embodiments, SMA 442 may extend along an outer surface of fan blade 300. In various embodiments, SMA 442 may be coupled to a current source 880 via a conductive medium 882 such as a wire or the like. In various embodiments, the temperature of SMA 442 may be controlled via resistive heating. Current source 880 may provide a current (i) to SMA 442. SMA 442 may comprise a resistance (R). In various embodiments, a temperature of SMA 442 may increase in response to an increase in current (i). The temperature of SMA 442 may increase proportional to the product of the square of the current and the resistance ($i^2R$). Likewise, the temperature of SMA 442 may decrease in response to a decrease in current (i). SMA 442 may undergo a phase change, as described herein, in response to a change in the temperature.

In various embodiments, SMA 442 may be configured to change from an austenitic phase to a martensitic phase in response to an increase in current from the current source 880. In various embodiments, SMA 442 may be configured to change from a martensitic phase to an austenitic phase in response to a decrease in current from the current source 880.

In various embodiments, a temperature sensor 884 may be embedded or otherwise located on fan blade 300. Temperature sensor 884 may detect a temperature of SMA 442. The current from current source 880 may be controllable based on a temperature sensed by the temperature sensor 884. The current from current source 880 may be controllable based on a resistance (R) of SMA 442.

With reference to FIG. 3C and FIG. 8, mean camber line 323 (or camber) of airfoil 302 may increase in response to an increase in temperature of SMA 442, in accordance with various embodiments. In various embodiments, mean camber line 323 (or camber) of airfoil 302 may increase in response to an increase in current being supplied to SMA 442. In various embodiments, mean camber line 323 (or camber) of airfoil 302 may decrease in response to an increase in temperature of SMA 442. In various embodiments, mean camber line 323 (or camber) of airfoil 302 may decrease in response to an increase in current being supplied to SMA 442.

Figure 6:
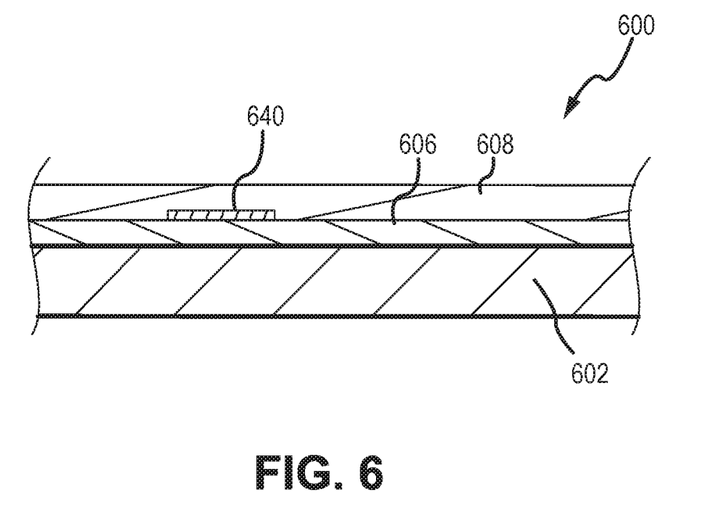
FIG. 6 illustrates a partial cross-section view of a composite fan blade, in accordance with various embodiments.
Figure 7:
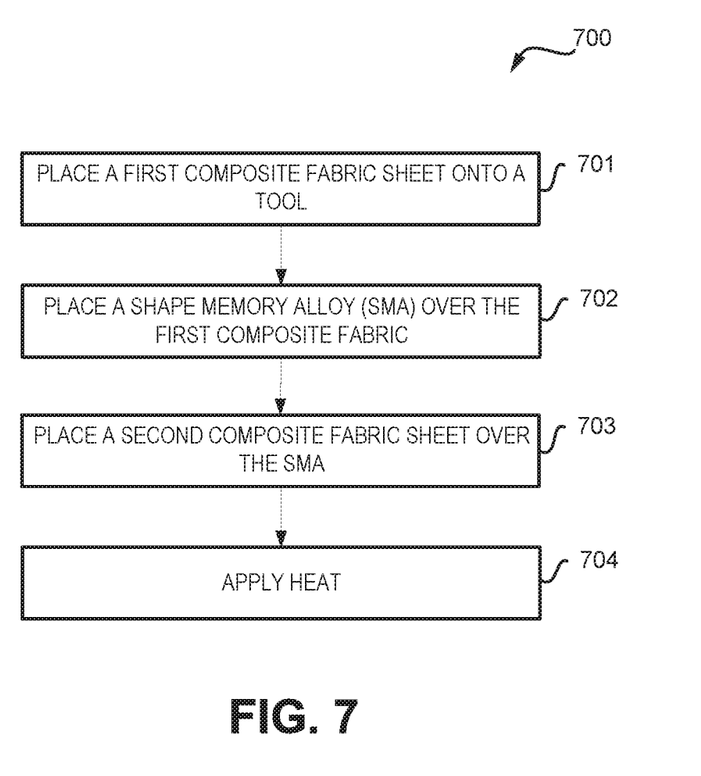
FIG. 7 illustrates a method of manufacturing a variable stiffness aerostructure, in accordance with various embodiments.

With reference to FIG. 6, a partial cross-section view of a composite fan blade 600 is illustrated, in accordance with various embodiments. In various embodiments, SMA 640 may be mechanically coupled between a first composite fabric sheet 606 and a second composite fabric sheet 608. SMA 640 may be attached to first composite fabric sheet 606 and/or second composite fabric sheet 608 via a resin, such as an epoxy for example. First composite fabric sheet 606 and/or second composite fabric sheet 608 may be laid up, during a composite layup process, onto a tool 602. With further reference to FIG. 7, a method 700 of manufacturing a variable stiffness aerostructure is provided, in accordance with various embodiments. First composite fabric sheet 606 may be placed onto tool 602 (see step 701). Shape memory alloy (SMA) 640 may be placed over first composite fabric sheet 606 (see step 702). Then, second composite fabric sheet 608 may be placed over SMA 640 (see step 703). In various embodiments, first composite fabric sheet 606 and second composite fabric sheet 608 may comprise a resin or a resin may otherwise be applied to first composite fabric sheet 606 and second composite fabric sheet 608. Heat may be applied to composite fan blade 600 (see step 704). Application of heat may cure the resin to harden and mechanically lock first composite fabric sheet 606, second composite fabric sheet 608, and SMA 640 into place. Thus, SMA 640 may be embedded into composite fan blade 600. Stated another way, at least first composite fabric sheet 606 and second composite fabric sheet 608 may comprise a laminate, the SMA 640 being mechanically locked between a first layer (i.e., first composite fabric sheet 606) and a second layer (i.e., second composite fabric sheet 608) via the resin.

In various embodiments, the resin may electrically insulate SMA 640. In various embodiments, first composite fabric sheet 606 and second composite fabric sheet 608 may electrically insulate SMA 640. First composite fabric sheet 606 and/or second composite fabric sheet 608 may comprise a carbon fiber, a fiber glass, or the like.

Figure 9:
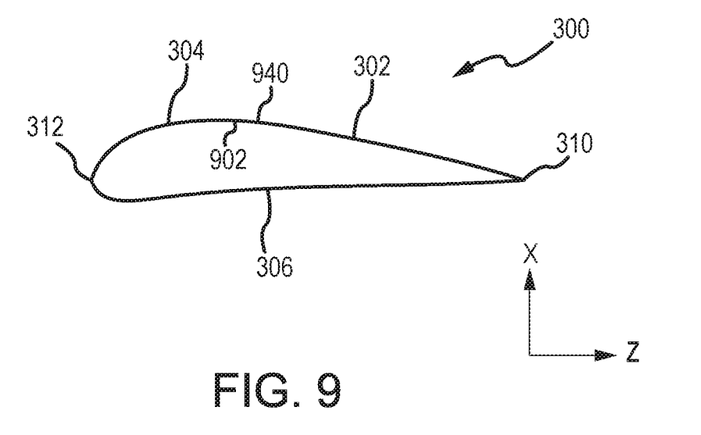
FIG. 9 illustrates a cross-section view of a fan blade having a shape memory alloy (SMA) defining an outer surface of the fan blade, in accordance with various embodiments.

With reference to FIG. 9, a cross-section view of fan blade 300 is illustrated having an SMA defining an outer surface of fan blade 300. In various embodiments, a cover plate of an aerostructure (i.e., fan blade 300) may be constructed of the SMA. In the case of an aluminum or titanium composite airfoil the SMA may be electrically isolated from the structure but mechanically coupled using an insulator. In various embodiments, at least a portion of top surface 304 and/or bottom surface 306 may comprise an SMA 940. Thus, the SMA 940 may comprise an outer surface defining at least a portion of fan blade 300. In various embodiments, an oxide 902 may be grown on a surface (i.e., top surface 304 and/or bottom surface 306) of the SMA 940 to insulate SMA 940. In various embodiments, a diffusion bond may be formed between the SMA 940 and fan blade 300. In various embodiments, SMA 940 may be attached to airfoil 302 via an adhesive such as a resin.

In various embodiments, SMA 940 may comprise a nickel-titanium alloy. In various embodiments, the fan blade 300 may be made of a cobalt alloy (e.g., HAYNES 188). In various embodiments, fan blade 300 may be made of a high performance nickel-chromium alloy such as an austenitic nickel-chromium-based superalloy (e.g., INCONEL or HAYNES 282). In various embodiments, the fan blade 300 may be made of aluminum. In various embodiments, the fan blade 300 may be made of a ceramic or composite, such and carbon fiber for example. In various embodiments, the fan blade 300 may be made of steel, titanium, or any other suitable material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite blade for a gas turbine engine, comprising:
   an airfoil extending from a leading edge to a trailing edge, the airfoil having a stiffness and a camber, the airfoil having a root and a tip;
   a first shape memory alloy (SMA) extending from the leading edge to the trailing edge, the first SMA defining a first direction and mechanically coupled to the airfoil via a first resin; and
   a second shape memory alloy (SMA) extending from a first corner defined by a first intersection of the leading edge and the tip to a second corner defined by a second intersection of the trailing edge and the root, the second SMA defining a second direction that is different from the first direction and mechanically coupled to the airfoil via a second resin, wherein the second SMA array is electrically isolated from the first SMA, wherein the camber changes in response to a first phase change of the first SMA and the airfoil twists in response to a second phase change of the second SMA.

2. The composite blade for the gas turbine engine of claim 1, wherein the composite blade comprises at least one of a carbon fiber composite or a glass fiber composite and the first SMA and the second SMA are configured to be coupled to a current source.

3. The composite blade for the gas turbine engine of claim 2, wherein the first SMA and the second SMA extend through an inner portion of the airfoil.

4. The composite blade for the gas turbine engine of claim 2, wherein the first SMA and the second SMA comprise a nickel-titanium alloy configured to change from an austenite phase to a martensite phase in response to a decrease in a current from the current source and configured to change from the martensite phase to the austenite phase in response to an increase in the current from the current source.

5. The composite blade for the gas turbine engine of claim 1, wherein the first direction is parallel to a fluid flow direction, and the second direction is at least one of an angle to the fluid flow direction or substantially perpendicular to the fluid flow direction.

6. The composite blade for the gas turbine engine of claim 1, wherein the first SMA and the second SMA extend along an outer surface of the airfoil.

7. The composite blade for the gas turbine engine of claim 1, wherein the composite blade comprises a laminate, the first SMA and the second SMA being mechanically coupled between a first layer and a second layer of the laminate via the first resin and the second resin, the first resin and the second resin electrically insulating the first SMA and the second SMA.

* * * * *